United States Patent
Ge et al.

(10) Patent No.: US 11,032,511 B1
(45) Date of Patent: Jun. 8, 2021

(54) FRAME INTERPOLATION METHOD AND RELATED VIDEO PROCESSOR

(71) Applicant: NOVATEK Microelectronics Corp., Hsin-Chu (TW)

(72) Inventors: Shuting Ge, Suzhou (CN); I-Feng Lin, Hsinchu County (TW); Haibo Liu, Linli Country (CN); Xiaohui Li, Shanghai (CN)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/930,417

(22) Filed: May 12, 2020

(30) Foreign Application Priority Data

Apr. 15, 2020 (CN) .......................... 202010297314.8

(51) Int. Cl.
*H04N 7/01* (2006.01)

(52) U.S. Cl.
CPC ......... *H04N 7/0147* (2013.01); *H04N 7/0115* (2013.01); *H04N 7/0127* (2013.01)

(58) Field of Classification Search
CPC .............................. H04N 19/05; H04N 7/012
See application file for complete search history.

(56) References Cited

U.S. PATENT DOCUMENTS

| | | | |
|---|---|---|---|
| 8,471,962 B2 * | 6/2013 | Deng | H04N 7/012 348/701 |
| 9,491,398 B1 | 11/2016 | Hou | |
| 10,368,031 B2 * | 7/2019 | Xu | H04N 7/0127 |
| 2010/0110304 A1 * | 5/2010 | Chen | H04N 7/012 348/701 |
| 2010/0238348 A1 * | 9/2010 | Wang | H04N 7/014 348/452 |
| 2011/0019083 A1 * | 1/2011 | Cordes | H04N 7/0112 348/441 |
| 2018/0139475 A1 * | 5/2018 | Hwang | H04N 21/440281 |

* cited by examiner

*Primary Examiner* — Paulos M Natnael
(74) *Attorney, Agent, or Firm* — Winston Hsu

(57) ABSTRACT

A frame interpolation method for a video processor includes the steps of: determining whether a first input frame is received following a long-term cadence; generating interpolated frames by applying phase coefficients in a regular phase table corresponding to the long-term cadence when the first input frame is received following the long-term cadence; and generating interpolated frames by applying phase coefficients in a bad edit phase table corresponding to a bad edit cadence when the first input frame is received without following the long-term cadence.

13 Claims, 9 Drawing Sheets

| Ideal cadence | 3 | 2 | 3 | 2 | 3 | 2 | 3 |
|---|---|---|---|---|---|---|---|
| Ideal frame | A A A | B B | C C C | D D | E E E | F F | G G |
| Real frame | A A | B B | C D | D E | E E | F G | G |
| Real cadence | 3 | 2 | 2 | 2 | 3 | 2 | 3 |

FIG. 4

| Cadence | 3 | 2 | 2 | 2 | 3 | 2 | 3 |
|---|---|---|---|---|---|---|---|
| Input frame | A A | B | C | D | E E | F | G G |

Detect bad edit

| Phase | 0 | 2/5 | 4/5 | 1/5 | 3/5 | 0 | 1/2 | 0 | 1/2 | 0 | 2/5 | 4/5 | 1/5 |
|---|---|---|---|---|---|---|---|---|---|---|---|---|---|
| Previous frame | A | A | A | B | C | C | D | D | E | E | E | E | F |
| Current frame | B | B | C | C | D | D | E | E | E | F | F | F | G |

Bad edit phase table

FIG. 6

| Cadence | 3 | 2 | 3 | | 3 | | 2 | 3 | |
|---|---|---|---|---|---|---|---|---|---|
| Input frame | A | A | B | C | C | D | D | E | F | F | G |

Detect bad edit

| Phase | 0 | 2/5 | 4/5 | 1/5 | 3/5 | 0 | 2/5 | 4/5 | 1/3 | 2/3 | 1/5 | 3/5 |
|---|---|---|---|---|---|---|---|---|---|---|---|---|
| Previous frame | A | A | A | B | B | C | C | D | D | D | E | E |
| Current frame | B | B | C | C | D | D | E | E | E | F |

Bad edit phase table

FIG. 8

FRAME INTERPOLATION METHOD AND RELATED VIDEO PROCESSOR

BACKGROUND OF THE INVENTION

1. Field of the Invention

The present invention relates to a frame interpolation method and a related video processor, and more particularly, to a method of generating interpolated image frames performed by a frame rate converter.

2. Description of the Prior Art

Motion estimation and motion compensation (MEMO) is a technology using frame interpolation, which allows a series of image frames to be displayed with different frame rates. For example, if a 30 Hz source video such as a film is required to be displayed in 60 Hz, an interpolated frame should be added between every two consecutive image frames in the source video, so as to double the frame rates.

Various methods have been developed for generating the interpolated frames. However, if the input image is unstable, the conventional methods may generate interpolated frames by taking a wrong source frame, resulting in an image jitter in the output video. This problem is called a bad edit problem. A conventional method deals with the bad edit problem by discarding wrong image frames for frame interpolation and conversion when the bad edit occurs, where some necessary image information may be lost. There is another method capable of dealing with the bad edit problem while remaining the image information; however, this method suffers from a long frame delay between the input frames and the output frames. Thus, there is a need for improvement over the prior art.

SUMMARY OF THE INVENTION

It is therefore an objective of the present invention to provide a novel method of generating interpolated frames for a frame rate converter, wherein the frame interpolation method is capable of reducing image jitters without loss of image information and large frame delay.

An embodiment of the present invention discloses a frame interpolation method for a video processor. The frame interpolation method comprises the steps of: determining whether a first input frame is received following a long-term cadence; generating interpolated frames by applying phase coefficients in a regular phase table corresponding to the long-term cadence when the first input frame is received following the long-term cadence; and generating interpolated frames by applying phase coefficients in a bad edit phase table corresponding to a bad edit cadence when the first input frame is received without following the long-term cadence.

Another embodiment of the present invention discloses a video processor, which comprises an interpolation circuit. The interpolation circuit is coupled to a frame buffer and a video source providing unit. The interpolation circuit is configured to generate interpolated frames by performing the following steps: determining whether a first input frame is received following a long-term cadence; generating interpolated frames by applying phase coefficients in a regular phase table corresponding to the long-term cadence when the first input frame is received following the long-term cadence; and generating interpolated frames by applying phase coefficients in a bad edit phase table corresponding to a bad edit cadence when the first input frame is received without following the long-term cadence.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of occurrence of a bad edit in the input video.

FIG. 6 is a schematic diagram of frame interpolation with a bad edit problem according to an embodiment of the present invention.

FIG. 8 is a schematic diagram of frame interpolation with a bad edit problem according to another embodiment of the present invention.

DETAILED DESCRIPTION

Figure 1:
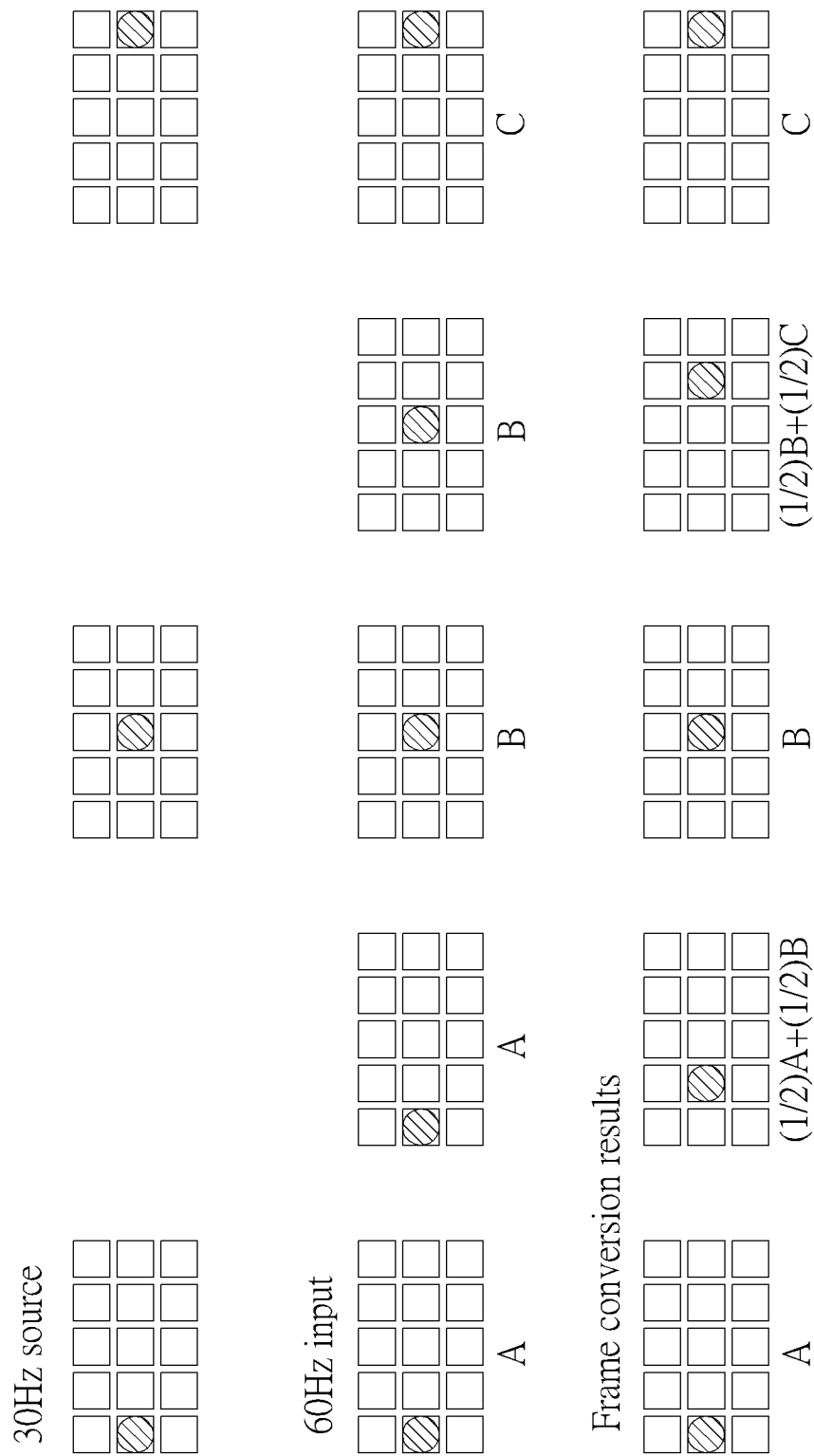
FIG. 1 illustrates an exemplary implementation of frame rate conversion where a 30 Hz source video is converted to be displayed in 60 Hz.

FIG. 1 illustrates an exemplary implementation of frame rate conversion where a 30 Hz source video is converted to be displayed in 60 Hz. As shown in FIG. 1, the source video includes three image frames on which an object moves from left to right. A 60 Hz input video is generated by interpolating a similar frame between two consecutive image frames in the source video, to generate a series of image frames A, A, B, B, C, C and so on, where the 2 image frames A are similar, the 2 image frames B are similar, and the 2 image frames C are similar. After frame conversion, the second image frame A may be converted to include image content with a combination of the image frames A and B. The coefficient $(½)A+(½)B$ indicates that a half of information in the image content is determined from the image frame A and another half of information in the image content is determined from the image frame B. The frame conversion scheme allows the video to be displayed more smoothly. Image frames of the source video are regarded as input frames to the frame rate converter.

Figure 2:
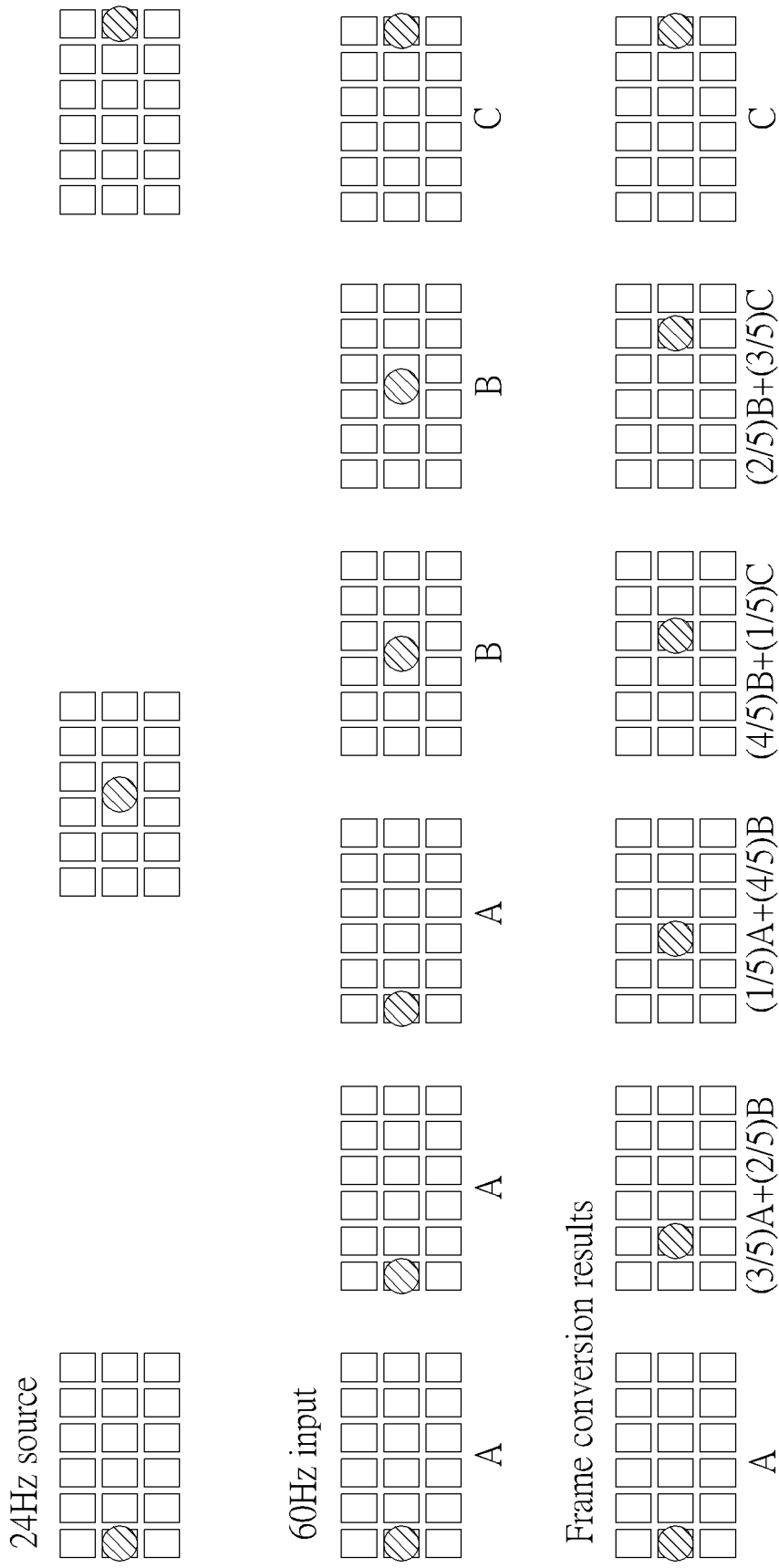
FIG. 2 illustrates another exemplary implementation of frame rate conversion where a 24 Hz source video is converted to be displayed in 60 Hz.

FIG. 2 illustrates another exemplary implementation of frame rate conversion where a 24 Hz source video is converted to be displayed in 60 Hz. In this example, 2 consecutive frames in the source video are interpolated to generate 5 input frames, i.e., 3 input frames A and 2 input frames B, where the 3 input frames A are similar and the 2 input frames B are similar. After frame conversion, the second input frame and the third input frame are converted to include image content with a combination of the input frames A and B by applying different coefficients, i.e., $(⅗)A+(⅖)B$ and $(⅕)A+(⅘)B$. The coefficients ⅗ and ⅖ indicate that ⅗ of information in the image content is determined from the input frame A and the other ⅖ of information in the image content is determined from the input frame B. The coefficients ⅕ and ⅘ indicate that ⅕ of information in the image content is determined from the input frame A and the other ⅘ of information in the image content is determined from the input frame B. The fourth input frame and the fifth input frame are converted to include image content with a combination of the input frames B and C by applying different coefficients, i.e., (⅘)B+(⅕)C and (⅖)B+(⅗)C. The interpolation parameters are similar to those described above and may be used for determining the image content after frame interpolation conversion.

Figure 3:
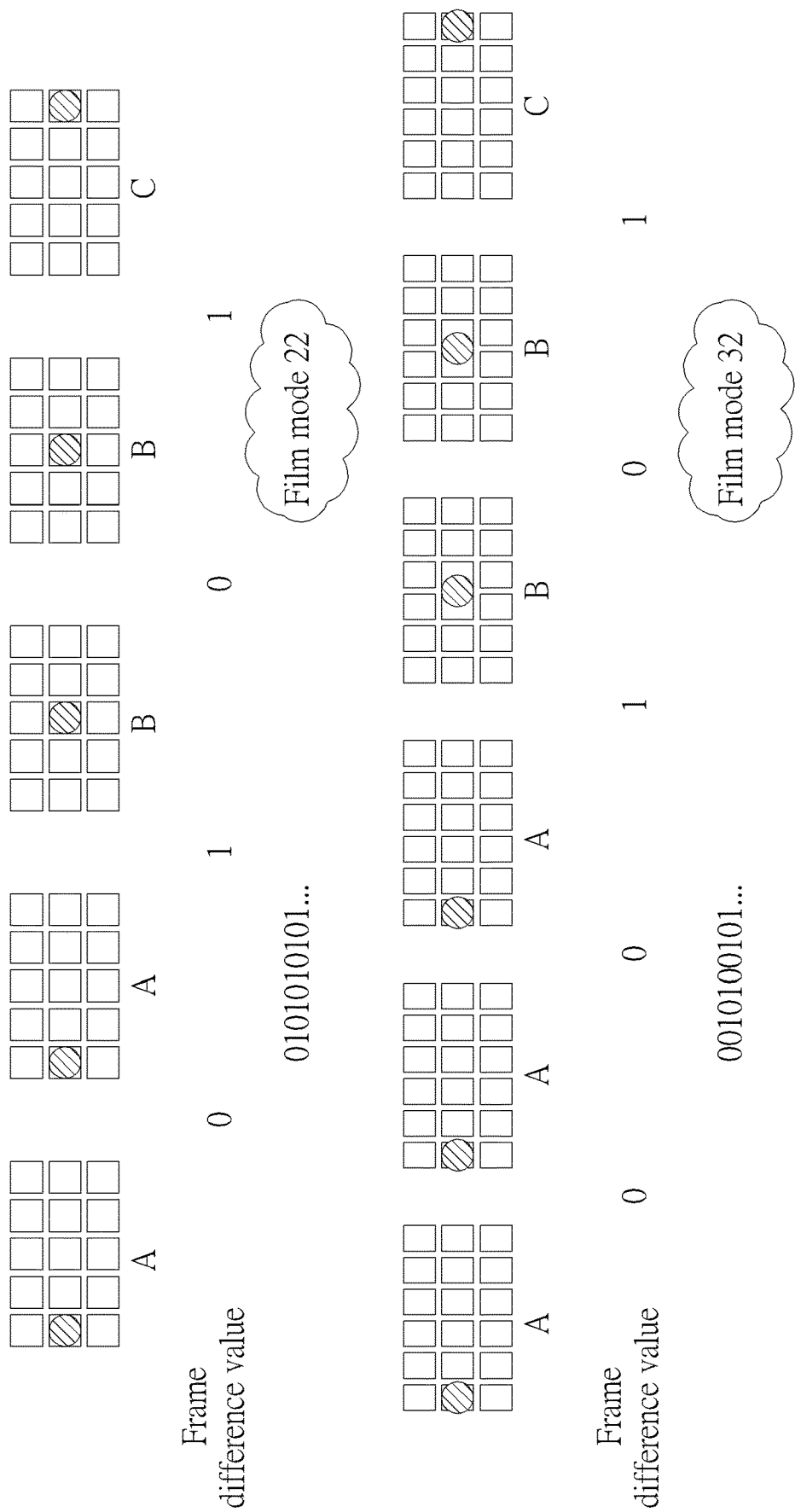
FIG. 3 is a schematic diagram of cadence detection and determination.

In the frame rate conversion scheme, a cadence is determined based on an input video which is played as a series of input frames by a specific frame rate. The cadence may be found by long-term detection according to a frame difference value generated from the comparison between two consecutive input frames in the input video. If two consecutive input frames are similar or the difference between two consecutive input frames is less than a threshold, the frame difference value will be 0; if two consecutive input frames are somewhat different or the difference between two consecutive input frames is greater than the threshold, the frame difference value will be 1. For example, in the example shown in FIG. 1, frame difference values with respect to input frames A, A, B, B, and C . . . in the input video may be 0, 1, 0, 1 . . . ; hence, the cadence is consecutively receiving every two similar input frames (which are considered as a frame group), and such a cadence specifies a film mode called film mode 22 hereinafter. In the case shown in FIG. 2, frame difference values with respect to input frames A, A, A, B, B, C, C . . . in the input video may be 0, 0, 1, 0, 1 . . . ; hence, the cadence is consecutively receiving three similar input frames then two similar input frames, where the three similar input frames are as a frame group and the two similar input frames are as another frame group, and such a cadence specifies another film mode called film mode 32 hereinafter. The detailed results of cadence detection and determination are illustrated in FIG. 3.

According to the long-term cadence (or said the film mode), the frame rate converter may apply proper coefficients for frame interpolation. However, if the cadence is unstable, a wrong input frame may be selected during frame interpolation since there may be an input frame lost or a redundant input frame included. This results in image jitter in the output video when the interpolation coefficients corresponding to the long-term cadence is still applied when the actual cadence is unstable. In such a situation, bad edit handling of motion estimation and motion compensation (MEMC) is applied to decrease or eliminate the influence on the output video due to the instable cadence of input frames. A bad edit means a wrong input frame which interrupts the long-term cadence.

Figure 4:
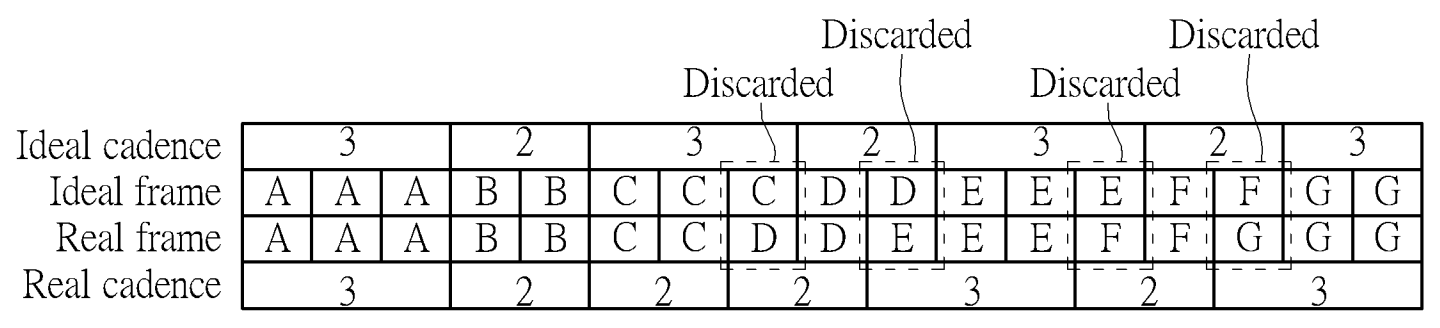

Please refer to FIG. 4, which is a schematic diagram of occurrence of a bad edit in the input video. In this exemplary case, the ideal cadence specifies the film mode 32 and the corresponding input frames include A, A, A, B, B, C, C, C, D, D, and so on. However, the real input frames (i.e. actually received frames) show that the third input frame C is lost and the first input frame D is received instead. That is, a real cadence becomes the film mode 22 from the film mode 32. In such a situation, if frame interpolation is performed based on the ideal cadence that specifies the film mode 32, image jitter may occur when playing an interpolated frame generated based on the first input frame D which is supposed to be the third input frame C.

In order to deal with this bad edit problem, a solution may be discarding the probably wrong frames for frame interpolation and conversion. In such a situation, some image information may be lost. Note that the similar input frames (e.g., 3 input frames C) in the input video may be slightly different and carry different information and the frame difference values among the input frames C are not greater than a threshold. If one of the 3 input frames C is discarded, some image information may be lost, which may result in image discontinuity.

Figure 5:
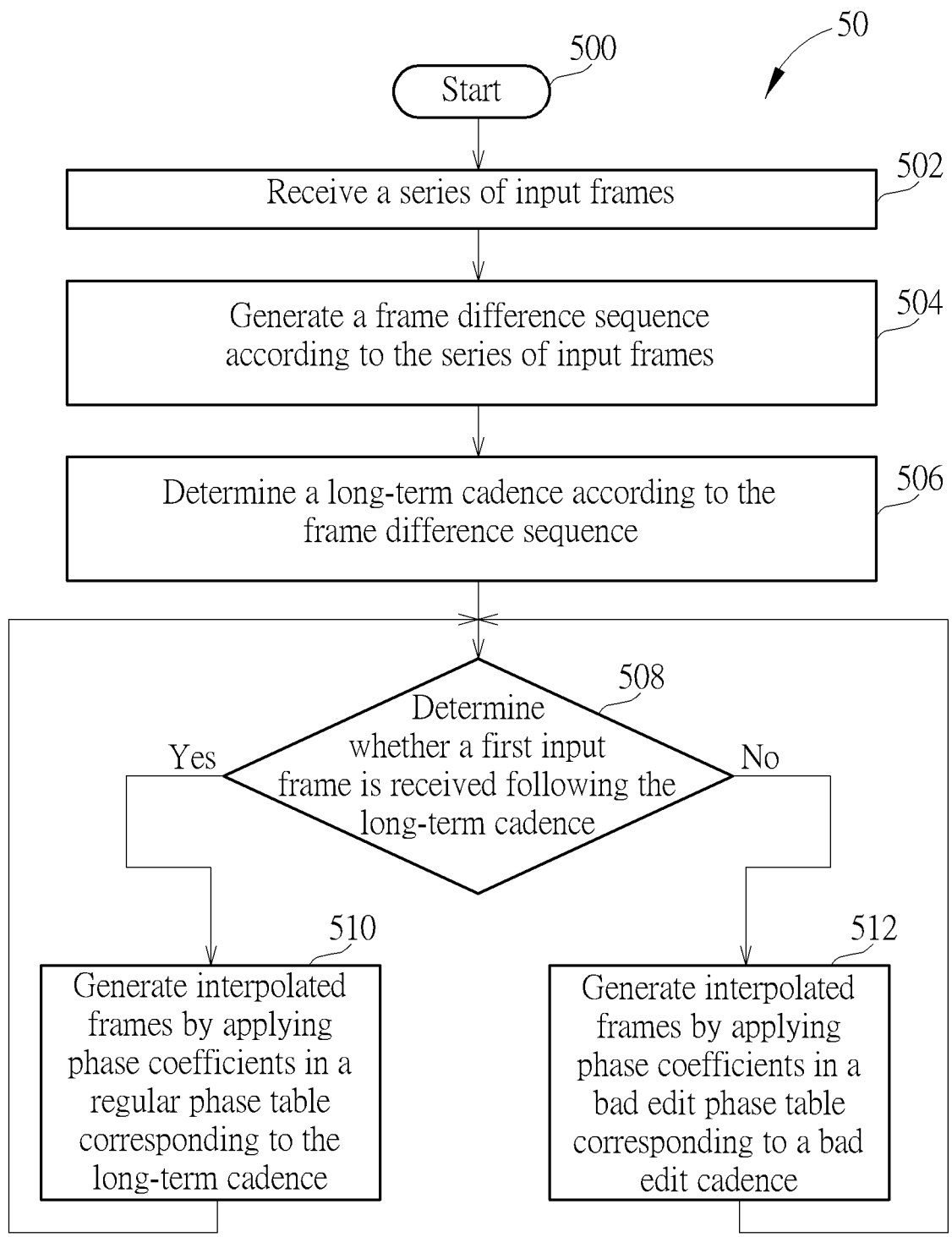
FIG. 5 is a flowchart of a frame interpolation process capable of handling the bad edit problem according to an embodiment of the present invention.

Please refer to FIG. 5, which is a flowchart of a frame interpolation process 50 capable of handling the bad edit problem according to an embodiment of the present invention. By applying the frame interpolation process 50, the frame delay between receiving an input frame and generating an interpolated frame based on the input frame becomes smaller and no image information is lost. The frame interpolation process 50 may be applied to a frame rate converter of a video processor to generate an output video based on input frames using a frame interpolation scheme. As shown in FIG. 5, the frame interpolation process 50 includes the following steps:

Step 500: Start.

Step 502: Receive a series of input frames.

Step 504: Generate a frame difference sequence according to the series of input frames.

Step 506: Determine a long-term cadence according to the frame difference sequence.

Step 508: Determine whether a first input frame is received following the long-term cadence. If yes, go to Step 510; otherwise, go to Step 512.

Step 510: Generate interpolated frames by applying phase coefficients in a regular phase table corresponding to the long-term cadence. Then return to Step 508.

Step 512: Generate interpolated frames by applying phase coefficients in a bad edit phase table corresponding to a bad edit cadence. Then return to Step 508.

According to the frame interpolation process 50, a long-term cadence is detected when a series of input frames are received and determined to comply with a film mode specified by the long-term cadence. For example, if the series of input frames include W, W, W, X, X, Y, Y, Y, Z and Z, where the same symbol denotes similar frames, the cadence may be determined to be receiving every frame group consisting of two consecutive input frames after every frame group consisting of three consecutive input frames, which specifies the film mode 32. Therefore, a regular phase table including phase information (represented by phase coefficients) corresponding to the long-term cadence is applied to frame interpolation operations. In other words, if the bad edit does not occur, the phase coefficients in the regular phase table may be applied to the frame interpolation operations. The phase coefficients are generated based on the film mode determined according to the long-term cadence and input/output frame rates. In such a situation, the phase step may be determined as follows:

$$phase\_step = diff\_count/total\_count \times in\_rate/out\_rate;$$

wherein phase_step refers to a phase step, diff_count refers to the number of dissimilar frame groups in a cycle, total_count refers to the number of total input frames in a cycle, in_rate refers to the input frame rate, and out_rate refers to the output frame rate.

FIG. 6 illustrates a schematic diagram of frame interpolation with a bad edit problem according to an embodiment of the present invention. Since the cadence specifies the film mode 32, there are two groups of frames (i.e., frame groups A and B) and totally 5 frames (i.e., frames A, A, A, B and B) in a cycle. The input frame rate equals the output frame rate. Therefore, the phase step is ⅖ and the phase coefficients are thereby determined to be 0, ⅖, ⅘, ⅕ and ⅗ in sequence, as shown in FIG. 6. Note that an interpolated frame is generated by combining a current frame and a previous frame which are being multiplied by respective phase coefficients, and the phase coefficients denoted in FIG. 6 are applied to current frames. The other phase coefficients applied to the previous frame are derived from 1 minus the phase coefficient for the current frame.

Based on the long-term cadence determined previously, the frame rate converter may determine whether a bad edit occurs according to every currently received input frame, which is called a first input frame in Step 508. If the first input frame is received without following the long-term cadence, a bad edit may occur. In an embodiment, a group change flag or a frame difference value is used to determine whether there is a bad edit, and the group change flag is generated for every received input frame. As mentioned above, in the input video, similar input frames may be classified as a frame group, e.g., 3 input frames A are classified as a frame group, and 2 input frames B are classified as another frame group. The group change flag may be represented by the frame difference sequence between consecutive input frames, to indicate whether an input frame and its previous input frame are similar and thus belong to the same frame group. For example, if an input frame is similar to its previous input frame (e.g., the difference between these two consecutive input frames is less than a threshold), the group change flag may be 0; if an input frame is different from its previous input frame (e.g., the difference between these two consecutive input frames is greater than the threshold), the group change flag may be 1. When the long-term cadence specifies the film mode 32, the group change flags with correct input frames may appear to be a sequence 0010100101 . . . which includes 00101 repeatedly shown.

Therefore, when the group change flag corresponding to a currently received input frame indicates that a series of consecutively received input frames (wherein the currently received input frame is the latest one) do not conform to the long-term cadence, the frame rate converter may determine that there is a bad edit. As shown in FIG. 6, a bad edit is detected after the frame rate converter receives the first input frame D in a time period during which the correct input frame is supposed to be the third input frame C if following the long-term cadence that specifies the film mode 32. In such a situation, the bad edit phase table is applied to generate an interpolated frame according to a bad edit cadence. In this embodiment, the bad edit cadence is determined according to a series of input frames received preceding to the input frame that is determined as being received but not following the long-term cadence.

In this embodiment, each of the interpolated frames is generated based on a current frame and a previous frame. Herein, the current frame is an input frame selected from a first frame group where the first input frame belongs to or a reproduced frame generated based on at least two input frames of the first frame group, and the previous frame is an input frame selected from a second frame group which are received previously to the first frame group. The first frame group and the second frame group are two consecutive frame groups.

Based on the example shown in FIG. 6, the bad edit cadence is determined to a cadence specifying the film mode 22, based on the input frames B, B, C, C, and therefore phase coefficients corresponding to current frames (which are selected from the input frames D or reproduced based on the input frames D) in frame interpolation are determined to be 0 and ½, according to a bad edit phase table corresponding to the cadence specifying the film mode 22. In the example of FIG. 6, another bad edit is detected after the frame rate converter receives the first input frame E in a time period during which the correct input frame is supposed to be the second input frame D if following the long-term cadence. In such a situation, the bad edit phase table is applied to generate an interpolated frame also according to the bad edit cadence specifying the film mode 22, since a series of input frames C, C, D, and D received preceding to the first input frame E indicates the film mode 22. Therefore, phase coefficients corresponding to current frames (which are selected from the input frames E or reproduced based on the input frames E) in frame interpolation are determined to be 0 and ½, also according to a bad edit phase table corresponding to the cadence specifying the film mode 22. Afterwards, the frame rate converter detects that the cadence recovers to the long-term cadence, and the regular phase table is applied to the combination of input frames E and F and follow-up input frames until the next bad edit is detected. Note that the usage of the regular phase table or the bad edit phase table is determined according to the cadence of the input frames. The regular phase table is applied when the bad edit does not occur. With occurrence of the bad edit, a bad edit phase table based on the cadence corresponding to the bad edit situation may be applied instead.

Please note that the bad edit handling should be adapted to the timing relations of the input frames and the output frames. For example, the bad edit cadence is determined based on four consecutive input frames B, B, C and C. However, the bad edit phase table is actually applied to the frame interpolation of generating two interpolated frames between the input frames C and the input frames D.

The present invention provides a frame interpolation method for handling the bad edit with a smaller frame delay. In the present invention, a regular phase table is applied according to the long-term cadence determined in advance, so that the frame interpolation may be performed even if a frame group is not entirely received. If a received input frame indicates that there is a bad edit, a corresponding bad edit phase table instead of the regular phase table may be applied, so as to handle the bad edit problem with a smaller frame delay.

Figure 7:
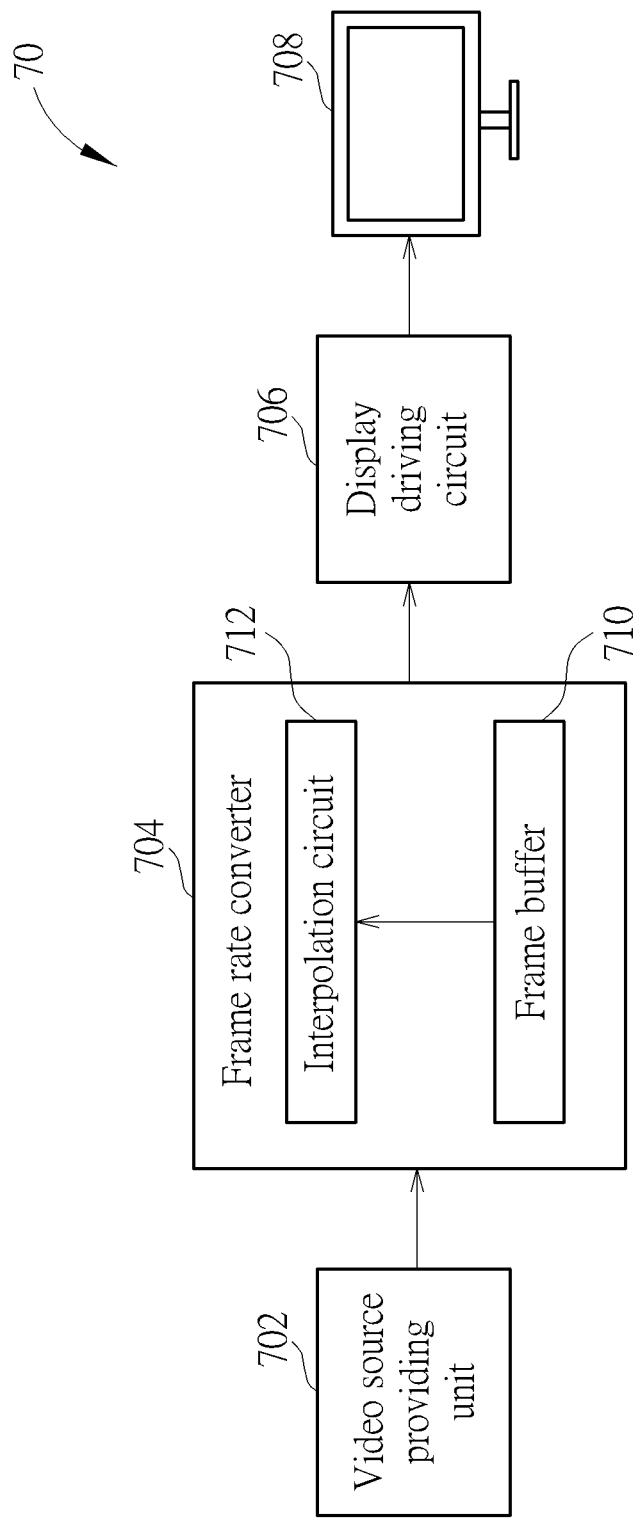
FIG. 7 is a schematic diagram of a display system according to an embodiment of the present invention.

Please refer to FIG. 7, which is a schematic diagram of a display system 70 according to an embodiment of the present invention. As shown in FIG. 7, the display system 70 includes a video source providing unit 702, a frame rate converter 704, a display driving circuit 706 and a display 708. The video source providing unit 702 generates a source video to be displayed on the display 708, where the source video may include a plurality of input frames. The display driving circuit 706 provides necessary information for the display 708, allowing the video to be displayed. The display driving circuit 706 may include a timing controller, a source driver, a gate driver, and/or any other devices capable of driving the display 708 to display a video.

As mentioned above, the frame rate of the source video may not be identical to the frame rate to be displayed on the display 708. Therefore, the frame rate converter 704 is capable of converting the frame rate of the video. The frame rate converter 704 may be a stand-alone integrated circuit (IC) apart from the video source providing unit 702 which is a video processor IC, or the frame rate converter 704 may be implemented in the video processor IC. A frame buffer 710 may be included in the frame rate converter 704 as illustrated in FIG. 7, for storing one or more input frames. Or, the frame buffer 710 may be apart from the frame rate converter 704. An interpolation circuit 712 of the frame rate converter 704 may be configured to receive original source video (regarded as input frames to the frame rate converter 704) from the video source providing unit 702 and also receive a previous frame stored in the frame buffer 710. The interpolation circuit 712 may generate every interpolated frame based on the previous frame used as a reference frame received from the frame buffer 710 and an input frame (as the current frame) from the video source providing unit 702 so as to generate interpolated frames having a frame rate conforming to the output format of the display 708. For example, if the frame rate of the source video is 30 Hz and the frame rate to be displayed on the display 708 is 60 Hz, the frame rate converter 704 may insert an interpolated frame between every two adjacent input frames. The frame rate converter 704 may be realized with software programs in a processing device and/or with hardware circuit performing specific functions.

In an embodiment, the frame rate converter 704 is configured to perform the steps of the frame interpolation process 50 of the present invention, so as to generate the interpolated frames based on the regular phase table when a correct input image is received or based on the bad edit phase table when a bad edit occurs.

Please note that a phase table such as the regular phase table or the bad edit phase table not only provides phase information for combining input frames to generate interpolated frames, but also provides information indicating which input frames to be selected as the previous frame and the current frame shown in FIG. 6. Table 1 illustrates the phase table of FIG. 6 including phase information in addition to some information for selecting the input frames for interpolation.

previous frame and current frame changes to the next groups. For example, between the indices 7 and 8 shown in Table 1, the phase increases from 4/5 to 6/5 (i.e., becoming 1/5 in another phase cycle), and the selected frames change and the parameter Table_start is set to 1 in the index 8. In other words, the parameter Table_start may be configured to group the output frames. In this embodiment, the phase coefficients 0, 2/5 and 4/5 (see indices 5-7) are considered as a group where input frames A and B are combined to generate the interpolated frames, and the phase coefficients 1/5 and 3/5 (see indices 8-9) are considered as a group where input frames B and C are combined to generate the interpolated frames.

In addition, the group difference parameters Grp_diff_p and Grp_diff_c refer to the difference between the frame group where the second input frame (previous frame) belongs to and the frame group where the first input frame (current frame) belongs to. Taking Table 1 as an example, in index 5, the group difference parameter for the previous frame is 1 (Grp_diff_p=1) and the first input frame is B, so that the previous frame is selected from the frame group consisting input frames A; the group difference parameter for the current frame is 0 (Grp_diff_c=0) and the first input frame is B, so that the current frame is selected from the frame group consisting of input frames B. The group difference parameters Grp_diff_p and Grp_diff_c allow the frame rate converter 704 to select target frames for interpolation. More specifically, the group difference parameters Grp_diff_p and Grp_diff_c may be calculated as follows:

Grp_diff_p[n]=Grp_diff_p[n−1]+Grp_chg_flag[n]−Table_start[n];

Grp_diff_c[n]=Grp_diff_c[n−1]+Grp_chg_flag[n]−Table_start[n];

wherein n refers to the index of these parameters. As can be seen, the group change flag may group the input frames

TABLE 1

| Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Cadence | 3 | | | 2 | | 2 | | 2 | | 3 | | | 2 | |
| Input | A | A | A | B | B | C | C | D | D | E | E | E | F | F |
| Grp_chg_flag | — | 0 | 0 | 1 | 0 | 1 | 0 | 1 | 0 | 1 | 0 | 0 | 1 | 0 |
| Phase | | | | | 0 | 2/5 | 4/5 | 1/5 | 3/5 | 0 | 1/2 | 0 | 1/2 | 0 |
| Grp_diff_p | | | | | 1 | 2 | 2 | 2 | 2 | 2 | 2 | 1 | 2 | 1 |
| Previous | | | | | A | A | A | B | B | C | C | D | D | E |
| Grp_diff_c | | | | | 0 | 1 | 1 | 1 | 1 | 1 | 1 | 0 | 1 | 0 |
| Current | | | | | B | B | B | C | C | D | D | E | E | F |
| Table_start | | | | | 1 | 0 | 0 | 1 | 0 | 1 | 0 | 1 | 0 | 1 |

As shown in Table 1, parameters Grp_chg_flag, Grp_diff_p, Grp_diff_c and Table_start are applied to determine which input frames are selected to be combined to generate the interpolated frames. These parameters allow the frame rate converter 704 to find correct input frames to be combined. More specifically, the parameter Grp_chg_flag refers to the group change flag as mentioned above. The group change flag indicates a frame group changes, where when the value of Grp_chg_flag is 1, the input frame belongs to a frame group not similar to its previous input frame belongs to. The parameter Table_start, which indicates a change in the selected frames, is determined from the phase. In general, in the regular phase table or the bad edit phase table, the phase changes increasingly between 0 and 1 by increasing one phase step for each arriving frame. Once the phase tends to exceed 1 and reaches another phase cycle, the parameter Table_start becomes 1 and the selection of the according to the difference between the input frames, and the group difference parameter allows the frames in the target group to be selected. Note that the previous frame and the current frame are selected from two consecutive groups, and therefore the group difference parameters Grp_diff_p and Grp_diff_c have the following relations:

Grp_diff_c[n]=Grp_diff_p[n]−1.

Based on the group change flag and the group difference parameters, the correct input frames for interpolation may be selected from a correct group even if there is a bad edit in the input video with one more input frame or one less input frame. This is because the selection of input frames for interpolation is based on the dedicated frame group rather than the dedicated input frame. It is possible that an input frame may be lost due to bad edit, but it is not possible that all input frames in a frame group are lost.

A phase table such as a regular phase table or a bad edit phase table includes information related to phase coefficients and selected input frames such as current frames and previous frames used for interpolation. In an embodiment, the frame selecting information such as the group change flag, the group difference parameters and the table start parameter are not included in the phase table but applied to determine which input frames to be selected and stored in the phase table. In another embodiment, the phase coefficients, the selected input frames and the frame selecting information may be included in the phase table as shown in Table 1.

As mentioned above, similar input frames in a frame group may be slightly different and include different information. In an embodiment, a phase table may further include a message or information indicating which input frame(s) in a frame group to be selected as the previous frame or the current frame. Take selection from the frame group consisting of the input frames B as an example. The input frames B received in the indices 4 and 5 may include slightly different information, and are hereinafter denoted by input frames B1 and B2, respectively. At the time corresponding to the index 5, the current frame is determined to be selected from the frame group consisting of the input frames B according to the abovementioned frame selecting rule, where the current frame should be the input frame B1 because the input frame B2 has not been completely received yet at this moment. At the time corresponding to the index 6, both the input frames B1 and B2 are completely received, and therefore the current frame B is selected from the input frame B1 or B2 or their combination. If the combination of input frames B1 and B2 is selected as the current frame of the index 6, it is preferable to select the combination of input frames B1 and B2 or only the input frame B2 as the current frame in the index 7. If only the input frame B2 is selected as the current frame of the index 7, it is preferable to select only the input frame B2 as the previous frame of the index 8. In general, the selection order of the previous frames and the current frames should be identical to the order of receiving the input frames in a group, in order to avoid an afterimage problem. Preferably, the selection is performed to allow the output video to be uniformly displayed. The afterimage problem, which may occur when a later input frame is selected to generate the interpolated frame before an earlier input frame, may cause discontinuity in the output video.

Please note that the present invention aims at providing a frame interpolation method capable of handling bad edit by grouping input frames. Those skilled in the art may make modifications and alternations accordingly. For example, in the above embodiments, the input frame rate, the output frame rate, and the related long-term cadence are only examples to facilitate the illustrations of the detailed implementations. Those skilled in the art should understand that the embodiments of the present invention are also applicable to other cadence with different frame rate conversions. In another embodiment, the bad edit problem may be generated with a redundant input frame.

Please refer to FIG. 8, which is a schematic diagram of frame interpolation with a bad edit problem according to another embodiment of the present invention. As shown in FIG. 8, the regular phase table with the phase coefficients and frame selections corresponding to a long-term cadence specifying the film mode 32 is applied, until occurrence of a bad edit. The bad edit occurs when the third input frame D is received since there should be only 2 input frames D according to the long-term cadence. Therefore, the input frames CCCDDD are determined as following a bad edit cadence, and thus the phases for combining the input frames D and E are determined according to phase coefficients corresponding to the bad edit cadence, i.e., 0, 1/3 and 2/3. Afterwards, the input frames D and E follow the long-term cadence specifying the film mode 32, so the frame rate converter 704 returns to use the regular phase table for combination of the input frames E and F.

In general, when the bad edit occurs at a frame group X in the input video such as the frame group of input frames C shown in FIG. 6 (where the third input frame C is lost) or the frame group of input frames D shown in FIG. 8 (where one redundant frame D is included), the frame interpolation of combining frame of the frame group X with frame of its next frame group (X+1) may be performed based on the phase coefficients in the bad edit phase table, where the bad edit phase table is determined according to the bad edit cadence obtained from the frame counts in the frame group X and its previous frame group (X−1).

Figure 9:
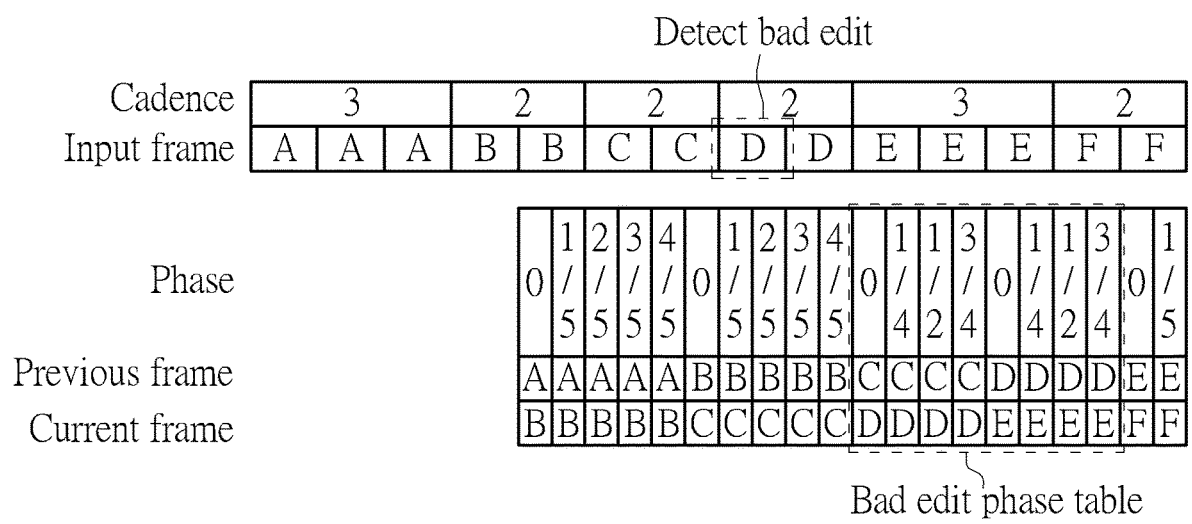
FIG. 9 is a schematic diagram of frame interpolation with a bad edit problem according to a further embodiment of the present invention.

Please refer to FIG. 9, which is a schematic diagram of frame interpolation with a bad edit problem according to a further embodiment of the present invention. FIG. 9 illustrates a situation where the output frame rate is twice the input frame rate. In this embodiment, the phase step is also calculated according to the abovementioned formula:

phase_step=diff_count/total_count×in_rate/out_rate.

In this embodiment, the phase step equals 1/5 because the output frame rate is twice the input frame rate. Also, the selected previous frame and current frame change when the phase tends to exceed 1 and reaches another phase cycle. In a similar manner, the bad edit phase table is applied for the frame interpolation of generating interpolated frames between the input frames C and D based on the bad edit cadence specifying the film mode 22 which is determined according to the input frames BBCC; and the bad edit phase table is applied for the frame interpolation of generating interpolated frames between the input frames D and E based on the bad edit cadence specifying the film mode 22 which is determined according to the input frames CCDD.

As mentioned above, frame interpolation may be performed according to the phase coefficients specified in the phase table. For example, the phase 2/5 means that 2/5 of information in the image content is determined from the current frame and the other 3/5 of information in the image content is determined from the previous frame. In detail, an image may be divided into a plurality of areas, and similarity of the areas in the previous frame and the areas in the current frame is determined. Similar areas in different locations may be considered as a moving object in the video. Based on the MEMC technique, the moving distance of the moving object may be obtained. Therefore, the moving object may appear in a position according to the phase coefficient obtained from the phase table. For example, if the phase is 1/2, the position of the moving object in the output image may be in the middle of its position in the previous frame and its position in the current frame. Finally, the border of the areas may be smoothed out to obtain the interpolated output frame.

To sum up, the present invention provides a method of handling bad edit by grouping frames for frame interpolation. According to embodiments of the present invention, a long-term cadence is determined in advance and a regular phase table is applied based on the long-term cadence. If the bad edit occurs, a bad edit phase table based on the bad edit cadence is applied, so as to handle the bad edit problem by using the phase coefficients in the bad edit phase table. In the phase table such as the regular phase table or the bad edit phase table, the input frames for interpolation are selected by finding the correct frame group of input frames and combining the selected input frames based on the phase coefficients. The frame interpolation method of the present invention has benefits of a smaller frame delay without loss of image information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame interpolation method for a video processor, comprising:
    receiving a series of input frames;
    generating a frame difference sequence according to the series of input frames;
    determining a long-term cadence according to the frame difference sequence;
    determining whether a first input frame is received following the long-term cadence;
    generating interpolated frames by applying phase coefficients in a regular phase table corresponding to the long-term cadence when the first input frame is received following the long-term cadence; and
    generating interpolated frames by applying phase coefficients in a bad edit phase table corresponding to a bad edit cadence when the first input frame is received without following the long-term cadence.

2. The frame interpolation method of claim 1, wherein the long-term cadence specifies a film mode that the series of input frames comply with.

3. The frame interpolation method of claim 1, further comprising:
    in response to that the first input frame is received without following the long-term cadence, determining the bad edit cadence according to a series of input frames received preceding to the first input frame.

4. The frame interpolation method of claim 1, wherein the step of determining whether the first input frame is received following the long-term cadence comprises:
    determining whether the first input frame is received following the long-term cadence by using a group change flag which indicates whether the first input frame and a previous input frame which is received preceding to the first input frame belong to the same frame group.

5. The frame interpolation method of claim 1, wherein generating the interpolated frames by applying the phase coefficients in the regular phase table or the bad edit phase table comprises:
    for generating each of the interpolated frames, combining a current frame and a previous frame which are being multiplied by respective phase coefficients, wherein the current frame is an input frame selected from a first frame group where the first input frame belongs to or a reproduced frame generated based on at least two input frames of the first frame group, and the previous frame is an input frame selected from a second frame group which are received previously to the first frame group, and wherein the first frame group and the second frame group are two consecutive frame groups.

6. The frame interpolation method of claim 5, further comprising:
    for each of the interpolated frames, calculating a first frame group difference parameter which indicates that the first frame group is selected, and calculating a second frame group difference parameter which indicates that the second frame group is selected.

7. A video processor, comprising:
    an interpolation circuit, coupled to a frame buffer and a video source providing unit, and configured to generate interpolated frames by performing the following steps:
        receiving a series of input frames;
        generating a frame difference sequence according to the series of input frames;
        determining a long-term cadence according to the frame difference sequence;
        determining whether a first input frame is received following the long-term cadence;
        generating interpolated frames by applying phase coefficients in a regular phase table corresponding to the long-term cadence when the first input frame is received following the long-term cadence; and
        generating interpolated frames by applying phase coefficients in a bad edit phase table corresponding to a bad edit cadence when the first input frame is received without following the long-term cadence.

8. The video processor of claim 7, wherein the long-term cadence specifies a film mode that the series of input frames comply with.

9. The video processor of claim 7, wherein the interpolation circuit is further configured to perform the following step:
    in response to that the first input frame is received without following the long-term cadence, determining the bad edit cadence according to a series of input frames received preceding to the first input frame.

10. The video processor of claim 7, wherein the interpolation circuit is configured to perform the following step to determine whether the first input frame is received following the long-term cadence:
    determining whether the first input frame is received following the long-term cadence by using a group change flag which indicates whether the first input frame and a previous input frame which is received preceding to the first input frame belong to the same frame group.

11. The video processor of claim 7, wherein the interpolation circuit is configured to perform the following step to generate the interpolated frames by applying the phase coefficients in the regular phase table or the bad edit phase table:
    for generating each of the interpolated frames, combining a current frame and a previous frame which are being multiplied by respective phase coefficients, wherein the current frame is an input frame selected from a first frame group where the first input frame belongs to or a reproduced frame generated based on at least two input frames of the first frame group, and the previous frame is an input frame selected from a second frame group which are received previously to the first frame group, and wherein the first frame group and the second frame group are two consecutive frame groups.

12. The video processor of claim 11, wherein the interpolation circuit is further configured to perform the following step:
    for each of the interpolated frames, calculating a first frame group difference parameter which indicates that the first frame group is selected, and calculating a second frame group difference parameter which indicates that the second frame group is selected.

13. The video processor of claim 7, wherein the video processor is a frame rate converter integrated circuit (IC).

\* \* \* \* \*